United States Patent Office 3,118,733
Patented Jan. 21, 1964

3,118,733
OXIDATION OF PARAFFIN HYDROCARBONS TO PRODUCE HYDROGEN PEROXIDE
Roy John Sampson, Norton-on-Tees, England, assignor to Imperial Chemical Industries Limited, London, England, a corporation of Great Britain
No Drawing. Filed Nov. 14, 1960, Ser. No. 68,684
Claims priority, application Great Britain Nov. 11, 1959
8 Claims. (Cl. 23—207)

This invention relates to a process for oxidizing paraffin hydrocarbons by reaction in vapour phase with gases containing oxygen.

The recovery in good yield of valuable intermediate products from rapid oxidation reactions of hydrocarbons with gases containing oxygen is complicated by difficulties in stopping further reaction at an intermediate stage to prevent subsequent decomposition of these products. In particular, the preparation of such intermediate products as hydrogen peroxide and olefins by this process from paraffin hydrocarbons having at least two carbon atoms is beset by these difficulties which are, however, largely overcome by the present invention. By intermediate products is meant products of a partial oxidation reaction wherein the reaction is stopped to prevent subsequent decomposition of these products as noted above.

Accordingly the present invention provides a process for the oxidation of a paraffin hydrocarbon with oxygen to form intermediate products in which the paraffin hydrocarbon and a gas containing oxygen are reacted together by mixing them to form a mixture above the upper explosive limit and at a temperature of 400° C. to 600° C. for a short time and then rapidly cooling the mixture by expansion to a temperature at which further reaction is substantially decreased.

The cooling of the products by expansion may be augmented by expansion into a cold gas, and/or the expanded gases may be further cooled at a slower rate to a temperature at which the products are sufficiently stable to permit their further treatment without substantial decomposition for example in purification processes such as distillation. For example, the gases may be further cooled by direct heat exchange with water sprays, with the advantage that soluble products such as hydrogen peroxide and formaldehyde are dissolved out of the gas phase.

The cooling of the product gases of the reaction is preferably effected by passing them from a high pressure zone to a low pressure zone through an orifice, such as a nozzle, so that cooling occurs by expansion in which the gas molecules acquire a more directed and less random movement. Either of these zones may be at atmospheric or other pressure. In order to prevent loss of benefit, due to conversion of this directed movement into random movement by collision with vessel walls, a cooling gas or water spray may be introduced into the moving gas stream. The latter technique has the advantage that it may also serve to extract hydrogen peroxide from the reaction products, the resultant solution of hydrogen peroxide being further purified if necessary, for example to remove aldehydes which may be formed by the process.

Suitable short contact times are for example 1 to 10 milliseconds or higher, the time selected being dependent upon the nature of the reaction. Preferably, however, the contact time does not substantially exceed 30 milliseconds. In general shorter reaction times are required for higher reaction temperatures and pressures. These short contact times in which the reaction gases are mixed at 400° C. to 600° C. are preferably effected by mixing separate streams of the reactant gases previously heated sufficiently to give a mixture within the stipulated temperature range. The reactant gases are preferably mixed in one or more small bore mixing tubes in which the gases flow at turbulent rates to effect rapid mixing. The lower paraffins such as ethane and propane with, however, at least two carbon atoms are preferred for use in the process. Preferably the reactant gases are mixed in proportions of at least 5 volumes of paraffin per volume of oxygen. Although theoretical considerations suggest that optimum yields of hydrogen peroxide are provided by maximum oxygen partial pressures, when reacting paraffins higher than ethane, in fact to maintain the mixture above the upper explosive limit, the oxygen must be attenuated with another gas, which is preferably of simple molecular structure, for example monoatomic or diatomic, in order to obtain maximum cooling effect by expansion. The oxygen is therefore preferably attenuated with an inert elemental gas, for example nitrogen. Preferably, however, the oxygen is attenuated with a rare gas, particularly helium or argon, which give a large cooling effect by expansion.

The reaction of the process is preferably carried out at a temperature between 500° to 600° C., and at moderately elevated pressures not in substantial excess of 20 atmospheres.

The principal products from the process of the present invention using paraffins with at least two carbon atoms are hydrogen peroxide and the corresponding olefins. The principal products are obtained in good yields, although minor amounts of other products such as epoxides and aldehydes may be produced. Hydrogen peroxide may be readily extracted from the gaseous reaction products by condensation.

Example 1

400 litres per hour of ethane preheated to approximately 600° C. were fed into a short fine bore capillary tube in which it was admixed in turbulent flow with 200 litres per hour of air fed at approximately the same temperature. The reactant gases were together in the capillary tube for approximately 0.2 millisecond, in which time they became thoroughly mixed. The capillary tube was arranged in a reaction zone maintained at 1.3 atmosphere's pressure and at 600° C. by controlling the preheat temperature of the reactant gases. The products escaped from the reaction zone through a nozzle comprising an elongated capillary tube of 2 mm. bore which led to a water-cooled liquid collection zone at atmospheric pressure. The residence time of the reactant gases in the reaction zone was approximately 30 milliseconds.

The liquid collected in the water-cooled zone consisted chiefly of hydrogen peroxide corresponding to 3.4% conversion of the oxygen fed, and water. The product gases which remained uncondensed consisted chiefly of unchanged reactants gas and ethylene corresponding to 5.5% conversion of the ethane in the reactant gases fed.

Example 2

In similar apparatus to that used in Example 1, propane and air were each fed at a rate of 250 litres per hour and 562° C. to the reaction zone through the capillary tube, reacted at 1.25 atmospheres pressure and 562° C. for 40 milliseconds and cooled. The liquid products comprised hydrogen peroxide, corresponding to 6.1% conversion of the oxygen and water. The chief gaseous products were ethylene and propylene in amounts each corresponding to 28% of the propane fed.

I claim:
1. A process for the oxidation of a lower paraffin hydrocarbon selected from the group consisting of ethane and propane to prepare hydrogen peroxide and the corresponding olefin as principal products with minor amounts of epoxide and aldehyde, said process comprising reacting said paraffin hydrocarbon with a gas containing oxygen by mixing them together in at least one small bore tube of capillary size in which the flow is turbulent to form a mixture above the upper explosive limit, said mixing being carried out at a temperature of 400° to 600° C., a pressure up to about 20 atmospheres and for a time up to about 30 milliseconds, rapidly cooling the mixture by expansion into a zone having a pressure less than the reaction pressure to a temperature at which further reaction is substantially decreased to obtain a reaction mixture containing said hydrogen peroxide and the olefin, epoxide and aldehyde corresponding to said paraffin hydrocarbon and separating said hydrogen peroxide from said reaction mixture.

2. A process according to claim 1 in which the said period is 1 to 20 milliseconds reaction time.

3. A process according to claim 1 in which the reaction temperature is 500 to 600° C.

4. A process according to claim 1 in which the oxygen partial pressure is a maximum consistent with retaining the mixture above the upper explosive limit.

5. A process according to claim 1 in which the gas containing oxygen contains a rare gas.

6. A process according to claim 5 in which the rare gas is a member of the group consisting of helium and argon.

7. A process according to claim 1 in which the reactant gases are mixed in the proportion of 5 volumes of paraffin hydrocarbon to one of oxygen.

8. A process according to claim 1 in which at least sufficient amount of a coolant is admitted to the expanding mixture for minimizing reheating effects.

References Cited in the file of this patent
UNITED STATES PATENTS

| | | |
|---|---|---|
| 2,376,257 | Lacomble | May 15, 1945 |
| 2,416,156 | Cook | Feb. 18, 1947 |
| 2,533,581 | Harris | Dec. 12, 1950 |
| 2,720,281 | Ruehrwein et al. | Oct. 11, 1955 |
| 2,775,510 | Gardner et al. | Dec. 25, 1956 |